US009992605B2

(12) United States Patent
Chou et al.

(10) Patent No.: US 9,992,605 B2
(45) Date of Patent: Jun. 5, 2018

(54) METHODS FOR PROVIDING SERVING NETWORK INFORMATION AND COMMUNICATIONS APPARATUSES UTILIZING THE SAME

(75) Inventors: Shuang-An Chou, Keelung (TW); Po-Han Chu, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 80 days.

(21) Appl. No.: 13/343,605

(22) Filed: Jan. 4, 2012

(65) Prior Publication Data
US 2013/0023252 A1 Jan. 24, 2013

Related U.S. Application Data

(63) Continuation-in-part of application No. 13/187,187, filed on Jul. 20, 2011.

(51) Int. Cl.
| | |
|---|---|
| *H04M 3/42* | (2006.01) |
| *H04W 4/00* | (2018.01) |
| *H04W 8/18* | (2009.01) |
| *H04W 4/20* | (2018.01) |

(52) U.S. Cl.
CPC .............. *H04W 4/001* (2013.01); *H04W 4/20* (2013.01); *H04W 8/183* (2013.01)

(58) Field of Classification Search
CPC ....... H04W 4/02; H04W 8/183; H04W 92/02; H04W 8/18; H04W 48/16; H04M 1/72511
USPC ........ 455/414.2, 432.1, 0.2, 0.3, 434, 435.1, 455/436–444, 455, 464; 370/310.2, 328, 370/331–334, 338
See application file for complete search history.

(56) References Cited

U.S. PATENT DOCUMENTS

| | | | | |
|---|---|---|---|---|
| 5,530,807 A | * | 6/1996 | Baker et al. | 709/226 |
| 5,835,856 A | * | 11/1998 | Patel | 455/406 |
| 5,884,168 A | * | 3/1999 | Kolev et al. | 455/432.1 |
| 6,178,335 B1 | * | 1/2001 | Vu | H04B 1/3816 455/420 |
| 6,668,176 B1 | * | 12/2003 | Koski et al. | 455/552.1 |

(Continued)

FOREIGN PATENT DOCUMENTS

| | | |
|---|---|---|
| CN | 1934891 A | 3/2007 |
| CN | 101345995 A | 1/2009 |

(Continued)

OTHER PUBLICATIONS

3GPP Layer 3 Specification, version 11.0.0, pp. 1-645, Sep. 2011.*

(Continued)

*Primary Examiner* — Steve D'Agosta
(74) *Attorney, Agent, or Firm* — McClure, Qualey & Rodak, LLP

(57) ABSTRACT

A communications apparatus is provided. A processor is coupled to a subscriber identity card and a radio transceiver module. The subscriber identity card camps on a cell operating in a serving network having a serving network identifier via the radio transceiver module. The processor at least includes a first processor logic unit obtaining information regarding the serving network identifier, a second processor logic unit carrying the information regarding the serving network identifier in a message to be transmitted to the serving network, and a third processor logic unit transmitting the message to the serving network via the radio transceiver module.

11 Claims, 8 Drawing Sheets

(56) References Cited

U.S. PATENT DOCUMENTS

| | | | |
|---|---|---|---|
| 6,735,417 B2* | 5/2004 | Fonseca et al. | 455/11.1 |
| 6,920,320 B2* | 7/2005 | Rathunde et al. | 455/422.1 |
| 7,151,757 B2* | 12/2006 | Beasley et al. | 370/331 |
| 7,162,225 B2* | 1/2007 | Ranta | 455/414.3 |
| 7,164,885 B2* | 1/2007 | Jonsson et al. | 455/41.2 |
| 7,260,419 B2* | 8/2007 | Lee | 455/566 |
| 7,570,951 B2* | 8/2009 | Classon et al. | 455/437 |
| 7,729,329 B2* | 6/2010 | Fujita et al. | 370/342 |
| 7,973,857 B2* | 7/2011 | Ahmaniemi et al. | 348/416.1 |
| 8,036,658 B2* | 10/2011 | Govindswamy et al. | 455/434 |
| 8,036,660 B2* | 10/2011 | Abramson et al. | 455/435.1 |
| 8,045,978 B2* | 10/2011 | Venkateswarlu | 455/432.1 |
| 8,463,277 B2 | 6/2013 | Huang et al. | |
| 2004/0109431 A1* | 6/2004 | Abrahamson | H04W 48/18 370/342 |
| 2004/0203744 A1* | 10/2004 | Hicks | H04W 48/16 455/432.1 |
| 2006/0084417 A1* | 4/2006 | Melpignano et al. | 455/418 |
| 2006/0268746 A1 | 11/2006 | Wijting et al. | |
| 2007/0254636 A1* | 11/2007 | Jiang | 455/414.1 |
| 2008/0108356 A1* | 5/2008 | Tamura et al. | 455/445 |
| 2008/0117893 A1* | 5/2008 | Witzel et al. | 370/352 |
| 2008/0194253 A1* | 8/2008 | Kuo | H04W 48/16 455/433 |
| 2009/0046655 A1* | 2/2009 | Zhao | H04W 24/04 370/331 |
| 2009/0047957 A1* | 2/2009 | Westerberg | H04W 36/14 455/436 |
| 2009/0109870 A1* | 4/2009 | Metke | H04L 45/46 370/254 |
| 2009/0191915 A1 | 7/2009 | Abramson et al. | |
| 2009/0239583 A1 | 9/2009 | Jheng | |
| 2010/0099403 A1* | 4/2010 | Kim | H04W 8/183 455/432.1 |
| 2010/0186068 A1 | 7/2010 | Okuyama | |
| 2011/0040836 A1 | 2/2011 | Allen et al. | |
| 2011/0098043 A1* | 4/2011 | Yu | H04W 60/00 455/435.1 |

FOREIGN PATENT DOCUMENTS

| | | |
|---|---|---|
| CN | 101541065 | 9/2009 |
| CN | 101800986 A | 8/2010 |
| TW | 200835359 | 8/2008 |
| TW | 200939823 | 9/2009 |
| TW | 201025975 | 7/2010 |
| WO | WO 2009/065053 | 5/2009 |
| WO | WO 2010/070526 | 6/2010 |

OTHER PUBLICATIONS

ETSI TS 124 087 Version 6.0.0 (Published Dec. 2004) Digital Cellular Telecommunications System (Phase 2+); UMTS; UUS; Stage 3 (3GPP TS 24.087 version 6.0.0 Release 6), pp. 1-27.*
3rd Generation Partnership Project; Technical Specification Group Core Network and Terminals; Mobile Radio Interface Layer 3 Specification; Core Network Protocols; Stage 3; Sep. 2011; pp. 1-645.
3rd Generation Partnership Project; Technical Specification Group Services and System Aspects; User-to-User Signalling (UUS); Service Description; Stage 1; Sep. 2012; pp. 1-15.
3rd Generation Partnership Project; Technical Specification Group Services and System Aspects; Unstructured Supplementary Service Data (USSD); Stage 1; Sep. 2012; pp. 1-9.
3rd Generation Partnership Project; Technical Specification Group Core Network and Terminals; User-to-User Signalling (UUS) Supplementary Service; Stage 3; Sep. 2012; pp. 1-26.
3rd Generation Partnership Project; Technical Specification Group Core Network and Terminals; Unstructured Supplementary Service Data (USSD); Stage 3; Sep. 2012; pp. 1-13.
English language translation of abstract of TW 200835359 (published Aug. 16, 2008).
English language translation of abstract of TW 201025975 (published Jul. 1, 2010).
Full English (machine) translation of CN101345995 (Published Jan. 4, 2009).
Full English (machine) translation of CN101800986 (Published Aug. 11, 2010).
Full English (machine) translation of CN1934891 (Published Mar. 21, 2007).

* cited by examiner

| IEI | Information element | Presence | Format | Length |
|---|---|---|---|---|
| 04 | Bearer capability 1 | O | TLV | 3-16 |
| 04 | Bearer capability 2 | O | TLV | 3-16 |
| 5C | Calling party BCD Number | O | TLV | 3-14 |
| 5D | Calling party sub-Address | O | TLV | 2-23 |
| 9E | Non-locking shift | O | T | 1 |
| PI | Proprietary IE | O | TLV | |
| 74 | Redirecting party BCD number | O | TLV | 3-19 |
| 7E | User-user | O | TLV | 3-35 |
| 97 | Locking shift | O | T | 1 |
| PI | Proprietary IE | O | TLV | |

FIG. 6

METHODS FOR PROVIDING SERVING NETWORK INFORMATION AND COMMUNICATIONS APPARATUSES UTILIZING THE SAME

CROSS REFERENCE TO RELATED APPLICATIONS

This application is a continuation-in-part (CIP) of U.S. patent application entitled "Methods for providing serving network information and communications apparatuses utilizing the same" Ser. No. 13/187,187 filed on Jul. 20, 2011. The entire contents of which are hereby incorporated by reference.

BACKGROUND OF THE INVENTION

Field of the Invention

The invention relates to methods for providing serving network information, and more particularly, to methods for providing serving network information of a communications apparatus to a peer communications apparatus and for providing serving network information of a peer communications apparatus to a user of a communications apparatus.

Description of the Related Art

The term "wireless", normally refers to an electrical or electronic operation, which is accomplished without the use of a "hard wired" connection. "Wireless communication", is the transfer of information over a distance without the use of electrical conductors or wires. The distances involved may be short (a few meters for television remote controls) or very long (thousands or even millions of kilometers for radio communications). The best known example of wireless communication is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and well-defined cellular communication technologies. For example, the Global System for Mobile communications (GSM) is a well-defined and commonly adopted communications system, which uses time division multiple access (TDMA) technology, which is a multiplex access scheme for digital radio, to send voice, data, and signaling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the 2G GSM system. The Wireless Fidelity (Wi-Fi) is a technology defined by the 802.11b engineering standard and can be used for home networks, mobile phones, video games, to provide a high-frequency wireless local area network.

With the advanced development of wireless communication technologies, the signal processing capability of a wireless communications apparatus has been greatly improved. In order to enhance functionality of a wireless communications apparatus, a method for providing serving network information to a peer communications apparatus is provided.

BRIEF SUMMARY OF THE INVENTION

Communication apparatuses and methods for providing serving network information of a communications apparatus to a peer communications apparatus and for providing serving network information of a peer communications apparatus to a user of a communications apparatus are provided. An embodiment of a communications apparatus comprises a processor coupled to a subscriber identity card and a radio transceiver module. The subscriber identity card camps on a cell operating in a serving network having a serving network identifier via the radio transceiver module. The processor at least comprises a first processor logic unit obtaining information regarding the serving network identifier, a second processor logic unit carrying the information regarding the serving network identifier in a message to be transmitted to the serving network, and a third processor logic unit transmitting the message to the serving network via the radio transceiver module.

Another embodiment of a method for providing serving network information of a communications apparatus to a peer communications apparatus comprises: obtaining information regarding a serving network identifier of a serving network associated with the communications apparatus; carrying the information regarding the serving network identifier in a message to be transmitted; and transmitting the message to the serving network.

Another embodiment of a method for providing serving network information of a peer communications apparatus to a user of a communications apparatus comprises: receiving a message from a serving network associated with the communications apparatus; decoding the message to obtain a serving network identifier of a serving network associated with the peer communications apparatus; and notifying the user of information regarding the serving network associated with the peer communications apparatus.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 6 is a table showing a list of exemplary content carried in a SETUP message according to an embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
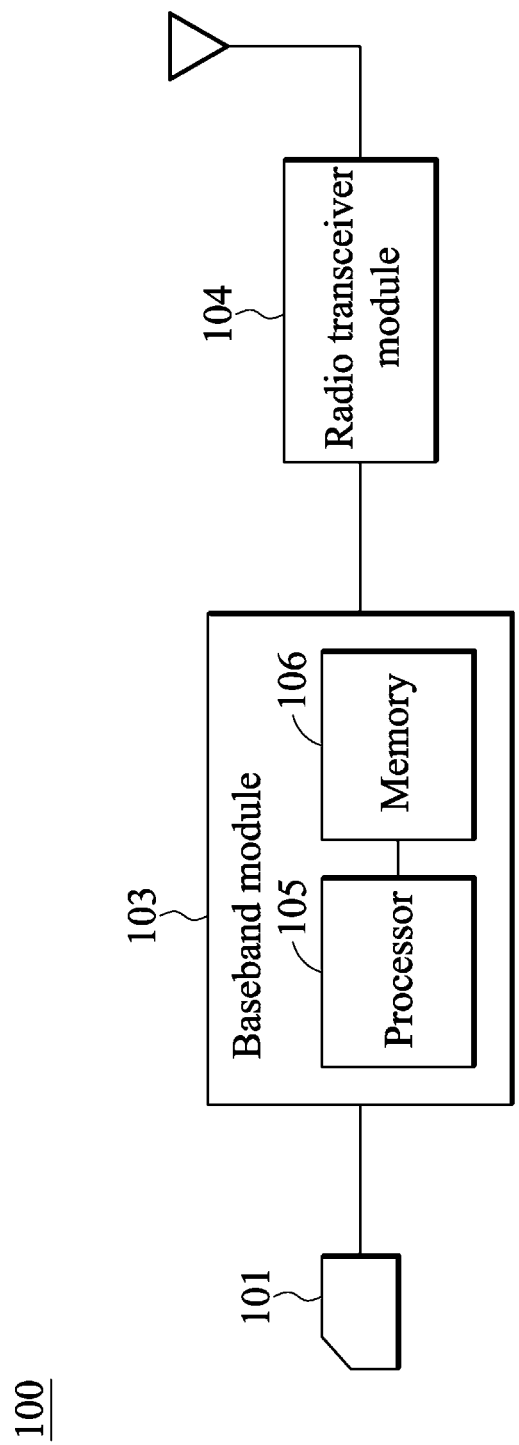
FIG. 1 shows a communications apparatus according to an embodiment of the invention.

FIG. 1 shows a communications apparatus according to an embodiment of the invention. As shown in FIG. 1, a communications apparatus 100 may comprise a subscriber identity card 101, a baseband module 103, and a radio transceiver module 104, wherein the baseband module 103 is coupled to the subscriber identity card 101 and the radio transceiver module 104. The radio transceiver module 104 receives wireless radio frequency signals and converts the received signals to baseband signals to be processed by the baseband module 103, or receives baseband signals from the baseband module 103 and converts the received signals to wireless radio frequency signals which are transmitted to a peer device. The radio transceiver module 104 may comprise a plurality of hardware devices to perform radio frequency conversion. For example, the radio transceiver module 104 may comprise a mixer to multiply the baseband signals with a carrier oscillated in the radio frequency of the wireless communication system, wherein the radio frequency may be, for example, 900 MHz or 1800 MHz for a global system for mobile communication (GSM), or 1900 MHz for a Universal Mobile Telecommunications System (UMTS), or others. The baseband module 103 further converts the baseband signals to a plurality of digital signals, and processes the digital signals, and vice versa. The baseband module 103 may also comprise a plurality of hardware devices to perform baseband signal processing. The baseband signal processing may comprise analog to digital conversion (ADC)/digital to analog conversion (DAC), gain adjustment, modulation/demodulation, encoding/decoding, and so on. The baseband module 103 further comprises a memory device 106 and a processor 105 for controlling the operations of the baseband module 103, the radio transceiver module 104, and the subscriber identity card 101 plugged into a socket of the communications apparatus 100. According to an embodiment of the invention, the processor 105 may comprise a plurality of processor logic units, each, designed for handling one or more functionalities (which will be discussed in more detailed in the following paragraphs). For example, the processor 105 may comprise at least a processor logic unit that reads data from the plugged in subscriber identity card 101 and writes data to the plugged in subscriber identity card 101.

The subscriber identity card 101 may be the subscriber identity module (SIM) card corresponding to the GSM, or the universal subscriber identity module (USIM) card corresponding to the UMTS, or the removable user identity module (RUIM) card or the CDMA Subscriber Identity Module (CSIM) card corresponding to the CDMA2000 communications system, or others. A SIM card typically contains user account information, an international mobile subscriber identity (IMSI) and a set of SIM application toolkit (SAT) commands and provides storage space for phonebook contacts. Note that the memory device 106 may also be configured outside of the baseband module 103 and the invention should not be limited thereto. Note also that FIG. 1 only shows one exemplary embodiment of the invention so as to simplify the description of the invention for a clearer understanding of the concepts of the invention. Any wireless communications module that can provide wireless communications services may also be integrated within the invention and the invention should not be limited thereto. In addition, each module as previously described may be implemented as an individual chip for providing corresponding functions, or may be integrated into a combo chip (i.e., a system on chip (SoC)), and the invention should not be limited thereto.

Figure 2:
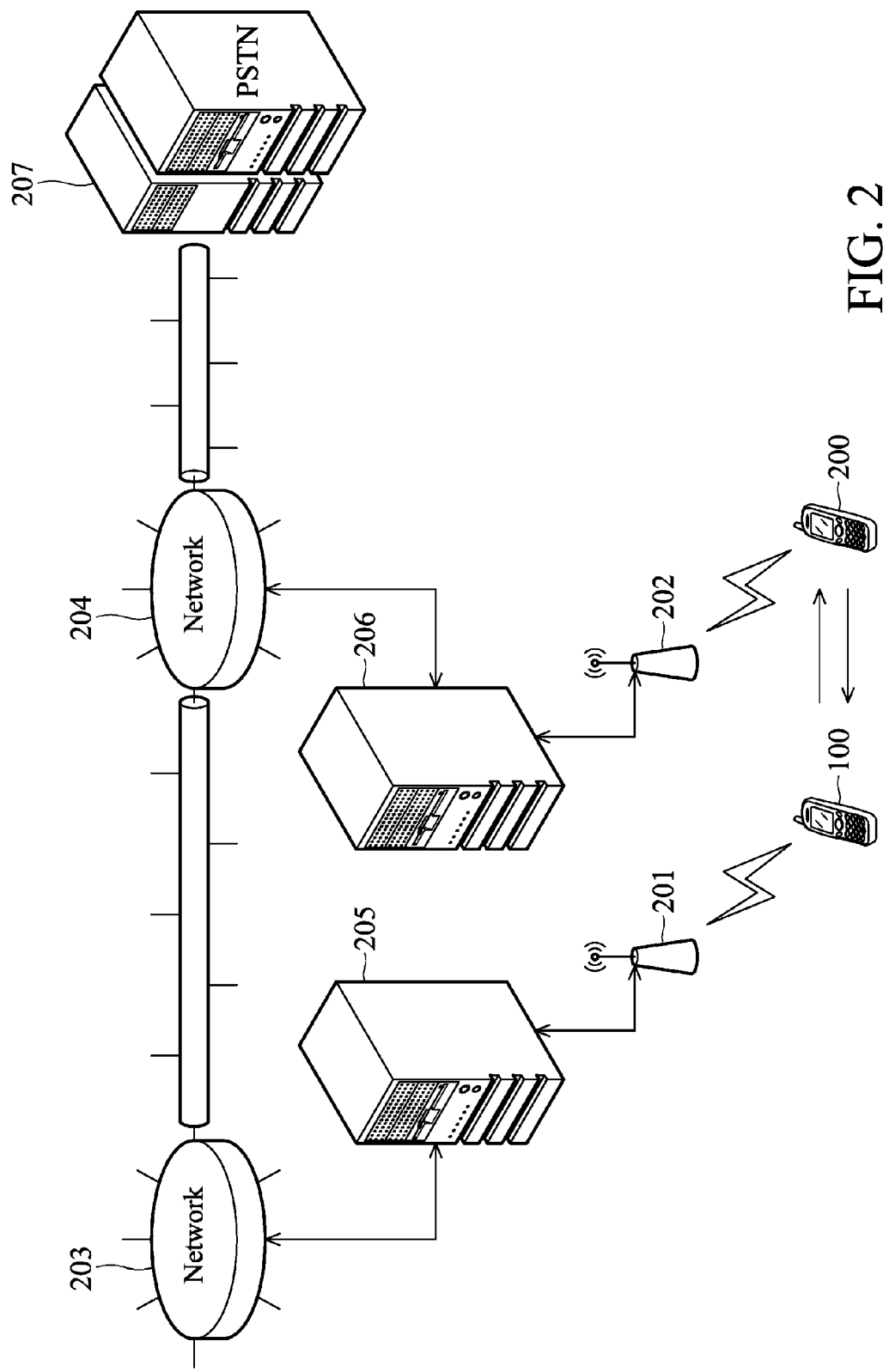
FIG. 2 shows an exemplary network topology according to an embodiment of the invention.

FIG. 2 shows an exemplary network topology according to an embodiment of the invention. The communications apparatuses 100 and 200 may access a serving network 203 or 204 after camping on or associating with the cells managed by the access station 201 or 202. The access stations 201 and 202 may be service nodes in the corresponding serving networks 203 and 204, such as a base station, a node-B, or an access point, or the likes. For example, the serving network 203 and/or the serving network 204 may be the GSM, WCDMA, Wi-Fi, CDMA2000 or Time Division-Synchronous Code Division Multiple Access (TD-SCDMA) network, or Internet, or the like. The communications apparatuses 100 and 200 may issue an apparatus originated communication request, also referred to as a mobile originated (MO) call request, such as a voice call, a data call, a video call, or a voice over Internet Protocol (VOIP) call, to a called party (i.e. the corresponding peer of another wired or wireless communications apparatus) through the networks 203 and 204 with corresponding intermediary apparatuses 205 and 206 (for example, the GSM network with a Mobile Switching Center (MSC), the WCDMA/TD-SCDMA network with a Radio Network Controller (RNC), or the Internet with a Session Initiation Protocol (SIP) server), or through the Public Switched Telephone Network (PSTN) 207 or any combinations thereof, by using any of the equipped subscriber identity cards. Moreover, the communications apparatuses 100 and 200 may receive an apparatus terminated communication request, also referred to as a mobile terminated (MT) call request, such as an incoming phone call, with any of the subscriber identity cards from a calling party. It is to be understood that there may be one or more gateways positioned between the heterogeneous types of networks.

Generally, the fee for the communications apparatus to perform an intra-serving network communication is cheaper than performing an inter-serving network communication, wherein the serving network is the public land mobile network (PLMN) managed by an operator. Therefore, according to an embodiment of the invention, when a communications apparatus is communicating with a peer communications apparatus, serving network information may be transmitted therebetween as useful information provided for the user of the communications apparatuses. As shown in FIG. 2, the serving network 203 may be a first PLMN managed by a first operator, and the access station 201 and the cells managed by the access station 201 may be the service nodes operated by the first operator in the serving network 203 (i.e. the first PLMN). Similarly, the serving network 204 may be a second PLMN managed by a second operator, and the access station 202 and the cells managed by the access station 202 may be the service nodes operated by the second operator in the serving network 204 (i.e. the second PLMN). The subscriber identity cards of the communications apparatuses 100 and 200 may respectively camp on or be associated with the same or different cells operated by the same or different operators in the same or different serving network. When the communications apparatuses 100 and 200 respectively camp on or associated with the same or different cells operated by the same operator, the communications established between the communications apparatuses 100 and 200 are intra-PLMN communications. On the other hand, when the communications apparatuses 100 and 200 respectively camp on or associated with the different cells operated by the different operators, the communications established between the communications apparatuses 100 and 200 are inter-PLMN communications.

According to an embodiment of the invention, the processor (e.g., the processor 105) of one communications apparatus (e.g., the communications apparatus 100) may embed information regarding a serving network identifier in a signal and transmit the signal to a peer communications apparatus (e.g., the communications apparatus 200) via the radio transceiver module (e.g., the transceiver module 104). The serving network identifier may be the PLMN identifier (PLMN_ID) or serving home PLMN identifier (HPLMN_ID) of the serving network associated with the communications apparatus. According to an embodiment of the invention, the serving network identifier may be obtained from an international mobile subscriber identity (IMSI) elementary file (e.g., the $EF_{IMSI}$) stored in the subscriber identity card. In addition, when the communications apparatus supports the feature "Equivalent HPLMN", the serving network identifier may also be obtained from the HPLMN elementary file (e.g., the $EF_{HPLMN}$) stored in the subscriber identity card.

According to an embodiment of the invention, the serving network identifier may be embedded as a watermark in the signal to be transmitted to the peer communications device. For example, the signal may be the speech, voice, audio or video signal transmitted via a circuit switch connection or a packet switch connection and the serving network identifier may be embedded as an audio watermark therein. For the technologies of embedding the watermark, reference may made to, for example, the paper "Robust audio watermarking in the time domain", published by P Bassia on Multimedia, IEEE Transactions 2002, or the paper "Real-Time Audio Watermarking System Prototype", published by J J G Hernandez on IP Multimedia Subsystem (IMS) 2006, or any other related textbooks, papers or publications. In addition, for the technologies of transmitting a signal via a circuit switch or a packet switch connection is well-known in the art, and will not be further discussed here for brevity.

Figure 3:
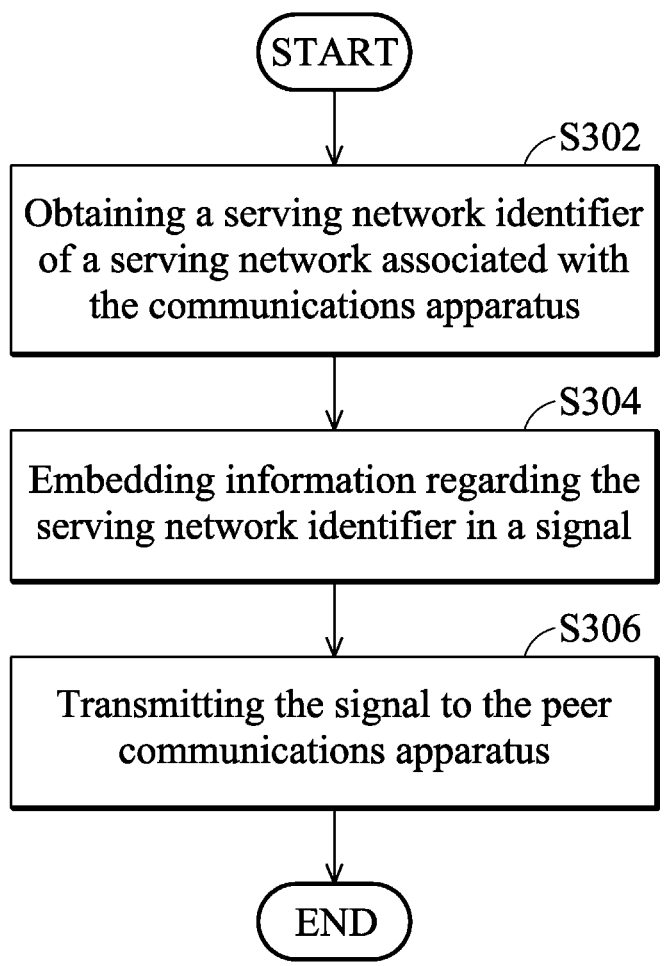
FIG. 3 shows a flow chart of a method for providing serving network information of a communications apparatus to a peer communications apparatus according to an embodiment of the invention.

FIG. 3 shows a flow chart of a method for providing serving network information of a communications apparatus to a peer communications apparatus according to an embodiment of the invention. The processor of the communications apparatus may first obtain a serving network identifier of a serving network associated with the communications apparatus (Step S302). As previously described, the serving network identifier may be obtained from the IMSI elementary file or the HPLMN elementary file stored in the subscriber identity card. Next, the processor may embed information regarding the serving network identifier in a signal (Step S304). Finally, the processor may transmit the signal to the peer communications apparatus (Step S306).

According to an embodiment of the invention, the function provided by the communications apparatus to embed the information regarding the serving network identifier as a watermark in a signal to be transmitted may be flexibly turned on or off according to the user's preference. For example, the communications apparatus may provide a user interface, such as a Man Machine Interface (MMI), to facilitate ease for the user to flexibly enable or disable the watermark embedding function. When the watermark embedding function is enabled, as the communications apparatus receives a signal, the communications apparatus may further decode the received signal to detect whether information regarding the serving network identifier associated with the peer communications apparatus which transmitting the signal is embedded therein. The decoding scheme for retrieving the serving network identifier embedded in the signal is dependent upon the coding scheme for embedding the serving network identifier.

Figure 4:
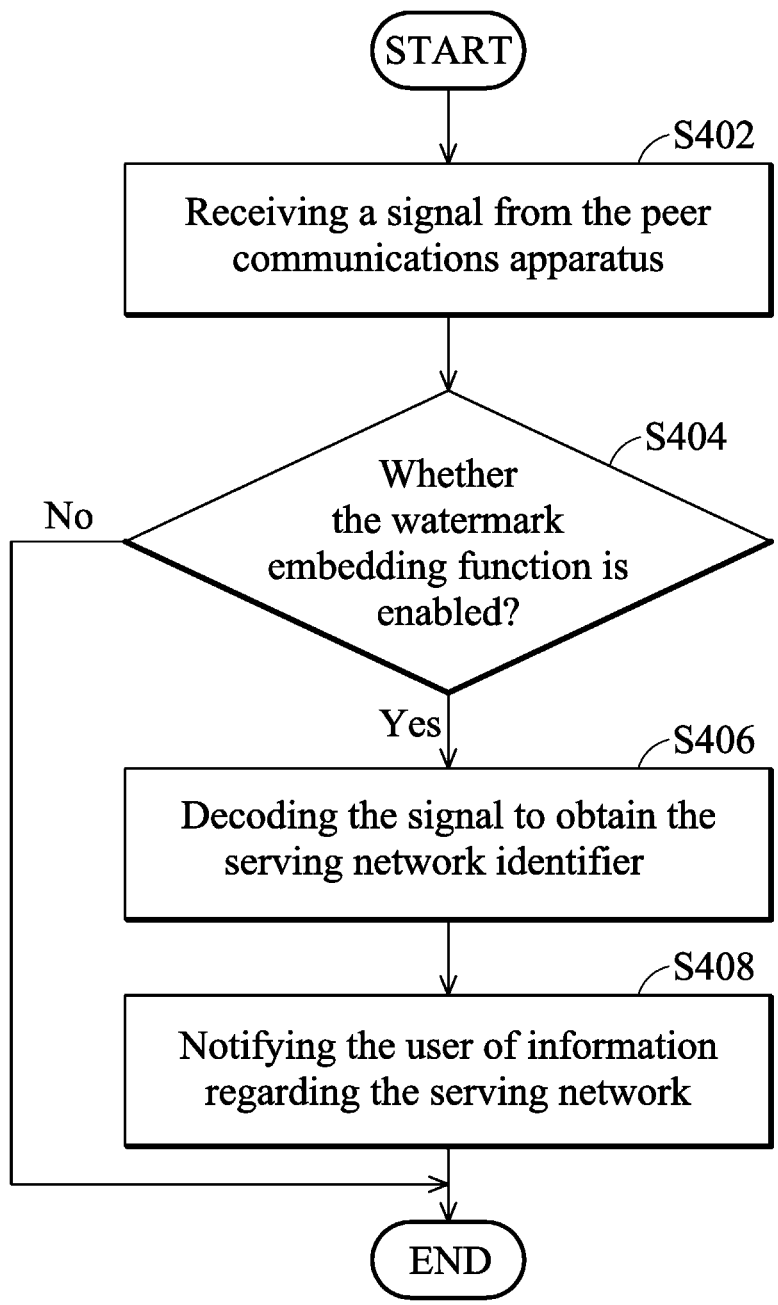
FIG. 4 shows a flow chart of a method for providing serving network information of a peer communications apparatus to a user of a communications apparatus according to an embodiment of the invention.

FIG. 4 shows a flow chart of a method for providing serving network information of a peer communications apparatus to a user of a communications apparatus according to an embodiment of the invention. The processor of the communications apparatus may first receive a signal from the peer communications apparatus (Step S402). Next, the processor may determine whether the watermark embedding function is enabled (Step S404). When the watermark embedding function is enabled, the processor may decode the signal to obtain the serving network identifier (Step S406). Finally, the processor may notify the user of information regarding the serving network (Step S408).

Figure 5:
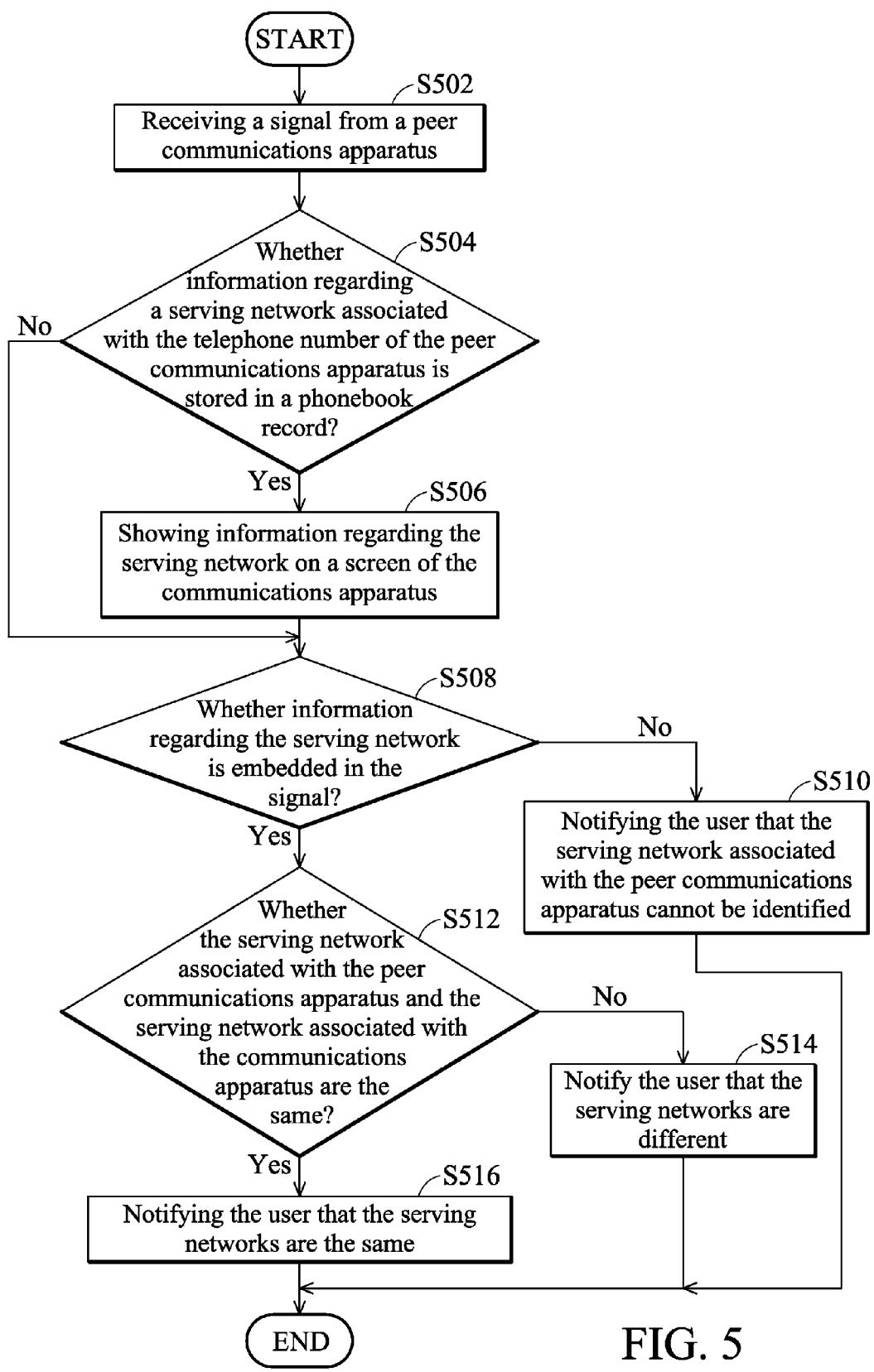
FIG. 5 is a flow chart showing a method for notifying the user of information regarding the serving network associated with a peer communications apparatus according to an embodiment of the invention.

According to an embodiment of the invention, the processor may notify the user of information regarding the serving network associated with the peer communications apparatus by playing a specific sound via the earphone, the receiver or the speaker of the communications apparatus, or generating a vibration, or popping a message on the screen of the communications apparatus, or directly showing the information on the screen of the communications apparatus, or others. FIG. 5 is a flow chart showing a method for notifying the user of information regarding the serving network associated with a peer communications apparatus according to an embodiment of the invention. The processor may first receive a signal from a peer communications apparatus (Step S502). Next, the processor may determine whether information regarding a serving network associated with the telephone number of the peer communications apparatus is stored in a phonebook record in the memory device (Step S504).

Generally, an entry of the phonebook is a data record of a data structure having at least a telephone number for a communications apparatus (i.e. a telephone number of the subscriber identity card). The processor may retrieve the phonebook record of the peer communications apparatus by using the telephone number thereof, and check whether information regarding the serving network of the peer communications apparatus is stored in the phonebook record. The information regarding the serving network may be the serving network identifier, such as the PLMN_ID or HPLMN_ID as previously described. When the information regarding the serving network associated with the peer communications apparatus is stored in the corresponding phonebook record, the processor may show information regarding the serving network on a screen of the communications apparatus to notify the user thereof (Step S506). For example, the processor may show the name of an operator managing the serving network on the screen.

Note that in the embodiments of the invention, showing the information regarding the serving network on the screen is an optional step. Next, the processor may determine whether the information regarding the serving network associated with the peer communications apparatus (i.e. the serving network identifier) is embedded in the signal transmitted by the peer communications apparatus (Step S508). When the information regarding the serving network associated with the peer communications apparatus is not embedded in the signal, the processor may notify the user that the serving network associated with the peer communications apparatus cannot be identified (Step S510)

When the information regarding the serving network associated with the peer communications apparatus is embedded in the signal, the processor may further decode the signal to obtain the information regarding the serving network associated with the peer communications apparatus and determine whether the serving network associated with the peer communications apparatus and the serving network associated with the communications apparatus are the same (Step S512). The determination may be made by checking whether the serving network identifier of the serving network associated with the peer communications apparatus is identical to that of the communications apparatus. Note that the serving network identifier of the communications apparatus may be obtained from the IMSI elementary file or the HPLMN elementary file stored in the subscriber identity card. When the serving networks are determined to be different, the processor may notify the user that the serving networks are different (Step S514). In this manner, the user may know that the communications established with the peer communications apparatus (having the corresponding telephone number) is inter-PLMN communications.

Otherwise, the processor may notify the user that the serving networks are the same (Step S516). In this manner, the user may know that the communications established with the peer communications apparatus (having the corresponding telephone number) is intra-PLMN communications and may have a cheaper fee. As previously described, the processor may notify the user by playing a specific sound via the earphone, the receiver or the speaker of the communications apparatus, or generating a vibration, or popping a message on the screen of the communications apparatus, or directly showing the information on the screen of the communications apparatus, or others. For example, in a preferred embodiment of the invention, when the user is having a conversion with a peer user of the peer communications apparatus, the processor may play a first tone (such as a "Bi" sound) via the earphone or the receiver to notify the user that the current communication is an intra-PLMN communication. The processor may play a second tone (such as a "BiBi" sound) via the earphone or the receiver to notify the user that the current communication may not be an intra-PLMN communication. The processor may further play a third tone (such as a "BiBiBi" sound) via the earphone or the receiver to notify the user that serving network associated with the peer communications apparatus cannot be identified. For another example, in another preferred embodiment of the invention, the processor may play a specific tone via the earphone or the receiver to notify the user that the current communication may not be an intra-PLMN communication or the serving network associated with the peer communications apparatus cannot be identified.

In addition, according to another embodiment of the invention, when the processor cannot obtain any information regarding the serving network from the signal transmitted by the peer communications apparatus, the processor may also use the information (if it is) previously stored in the phonebook record corresponding to the telephone number of the peer communications apparatus obtained in step S504, to determine whether the serving networks are the same as in step S512, and to notify the user as in steps S514 and S516.

Note that according to yet another embodiment of the invention, the processor may further determine whether the serving network information stored in the phonebook record associated with the telephone number is identical to the serving network information obtained from the currently received signal. When the two serving network information are different, the processor may replace the serving network information stored in the phonebook record by the serving network information obtained from the latest received signal, so as to update the serving network information to the latest one.

According to some other embodiments of the invention, the processor (e.g., the processor 105) of one communications apparatus (e.g., the communications apparatus 100) may also carry information regarding a serving network identifier in a message and transmit the message to the serving network (for example, the serving network 203 or the serving network 204) via the radio transceiver module (e.g., the transceiver module 104). As a result of transmission of the message, the information regarding the serving network identifier will ultimately be forwarded to a peer communications apparatus (e.g., the communications apparatus 200).

As previously described, the processor 105 may comprise a plurality of processor logic units, each, designed for handling one or more functionalities. For example, the processor 105 may at least comprise a first processor logic unit for obtaining information regarding the serving network identifier, a second processor logic unit for carrying the information regarding the serving network identifier in a message to be transmitted to the serving network, and a third processor logic unit transmitting the message to the serving network via the radio transceiver module. As previously described, the serving network identifier may be the PLMN identifier (PLMN_ID) or serving home PLMN identifier (HPLMN_ID) of the serving network associated with the communications apparatus, and may be obtained from an international mobile subscriber identity (IMSI) elementary file (e.g., the $EF_{IMSI}$) stored in the subscriber identity card. In addition, when the communications apparatus supports the feature "Equivalent HPLMN", the serving network identifier may also be obtained from the HPLMN elementary file (e.g., the $EF_{HPLMN}$) stored in the subscriber identity card.

According to an embodiment of the invention, the message may be transmitted over a signaling channel (which is different from the traffic channel established for circuit switch or packet switch connection as described above). As an example, the message may be a call control (CC) message transmitted during a call setup procedure, such as a SETUP message, a CALL PROCEEDING message, an ALERTING message, a CONNECT message, or others. Note that one of ordinary skilled in the art will readily appreciated that there are still a lot of call control messages transmitted during a call setup procedure, and the invention should not be limited to the messages listed above. As another example, the message may also be a call related supplementary service message. As yet another example, the message may further be a call independent supplementary service message. Embodiments of carrying the information regarding the serving network identifier in a message will be illustrated in more detail in the following paragraphs.

According to a first embodiment of the invention, the information regarding the serving network identifier may be carried in an information element (IE) field in the message, where the information element (IE) may be an IE well-defined in the specification of the corresponding radio access technology (RAT) but currently unused (for some specific reasons). For example, the IE which is well-defined but is currently unused and may be a "calling party sub-address", which has a corresponding information element identifier (IEI) as "5D". FIG. 6 is a table showing a list of exemplary content carried in a SETUP message according to an embodiment of the invention. As shown in FIG. 6, the IEI column specifies the identifier of a corresponding information element (IE), the Information element column specifies the content of the information element (IE), the Presence column specifies whether the information element (IE) is an optional IE or a mandatory IE, the Format column specifies the format of the IE should be carried in the message, where T represents type, L represents the length and V represent the value, and the Length column specifies a length of the corresponding IE. In the first embodiment, the second processor logic unit may carry the serving network identifier as the value in the "calling party sub-address" field of the call SETUP message. For example, the bit string "5D"+"length"+"PLMN_ID" may be carried in the call SETUP message, where the "length" should be set as the length of the PLMN_ID. For the peer communications apparatus receiving the call SETUP message forwarded by the corresponding serving network, the peer communications apparatus may decode and therefore, retrieve information regarding the PLMN_ID after identifying the IEI "5D" of the calling party sub-address IE. For further introduction of the call SETUP message, reference may made to, for example, the corresponding specification 3GPP TS 24.008 Chapter. 9.3.23 "Setup".

According to a second embodiment of the invention, the information regarding the serving network identifier may be carried in an information element (IE) field in the message, such as a locking shift information element (IE). Generally, there are eight codesets to encode/decode the IEs carried in the CC message. The codeset 0 is the initially active codeset. When a shift IE procedure is not applied, the IEs carried in the CC message are decoded (that is, interpreted) according to codeset 0. However, when a shift IE procedure is applied, the IEI and IE may be re-defined, so that the IE carried in the CC message should be decoded according to a new codeset. The coding rule for interpreting the IEs may be flexibly defined, as long as the transmitting and receiving communications apparatuses are capable of interpreting the newly defined IE according to the new codeset. The new codeset may be selected as codeset 7, which is reserved for user-specific information elements.

As defined in the specification, there are two codeset shifting procedures, including locking shift and non-locking shift. The new codeset is activated after locking shift IE or non-locking shift IE. The locking shift procedure employs an information element to indicate the new active codeset. The specified codeset remains active until another locking shift information element is encountered which specifies the use of another codeset. For example, codeset 0 is active at the start of message content analysis. If a locking shift to codeset 5 is encountered, the next information elements will be interpreted according to the information element identifiers assigned in codeset 5, until another shift information element is encountered. This procedure is used only to shift to a higher order codeset than the one being left. The locking shift is valid only within that message which contains the locking shift information element. At the start of every message content analysis, the active codeset is codeset 0.

In the second embodiment, the information regarding the serving network identifier may be carried in a locking shift information element (IE) field, such as the proprietary IE field following the locking shift IE field "97" shown in FIG. 6, in any call control (CC) message transmitted during a call setup procedure. For example, as long as the new codeset is well-defined and known by a peer communications apparatus, the second processor logic unit may carry the bit string of "04"+"length"+"PLMN_ID" in a CC message following the bit string of "97", where the "97" is the IEI of the locking shift information element (IE) for activating the locking shift procedure, "04" and may be a newly defined IEI for the PLMN ID information element (IE), wherein "length" should be set as the length of the PLMN_ID. Note that because of the activation of the locking shift procedure, the IEI "04", which was interpreted as the bearer capability based on codeset 0, is now interpreted as the PLMN_ID other than bearer capability based on the new codeset.

According to a third embodiment of the invention, the information regarding the serving network identifier may be carried in an information element (IE) field in the message, such as a non-locking shift information element (IE). The non-locking shift procedure provides a temporary shift to the specified lower or higher codeset. The non-locking shift procedure uses a type 1 information element to indicate the codeset to be used to interpret the next information element. After the interpretation of the next information element, the active codeset is again used for interpreting any following information elements. For example, codeset 0 is active at the beginning of message content analysis. If a non-locking shift to codeset 6 is encountered, only the next information element is interpreted according to the information element identifiers assigned in codeset 6. After this information element is interpreted, codeset 0 will again be used to interpret the following information elements.

In the third embodiment, the information regarding the serving network identifier may be carried in a non-locking shift information element (IE) field, such as the proprietary IE field following the non-locking shift IE field "9E" shown in FIG. 6, in any call control (CC) message transmitted during a call setup procedure. For example, as long as the new codeset is well-defined and known by a peer communications apparatus, the second processor logic unit may carry the bit string of "04"+"length"+"PLMN_ID" in a CC message following the bit string of "9E", where the "9E" is the IEI of the non-locking shift information element (IE) for activating the non-locking shift procedure, "04" and may be a newly defined IEI for the PLMN_ID information element (IE), wherein "length" should be set as the length of the PLMN_ID. Note that because of the activation of the non-locking shift procedure, the IEI "04", which was interpreted as the bearer capability based on codeset 0, is now interpreted as the PLMN_ID other than bearer capability based on the new codeset. For further introduction of the locking shift IE and non-locking shift IE, reference may made to, for example, the corresponding specification 3GPP TS 24.008 Chapter. 10.5.4 "Call control information".

According to a fourth embodiment of the invention, the message may be a user to user signaling (UUS) message, and the information regarding the serving network identifier may be carried in the UUS message. There are three different types of UUS services, including a user to user signaling service 1 (UUS1), user to user signaling service 2 (UUS2) and user to user signaling service 3 (UUS3). In the fourth embodiment of the invention, for the UUS1 application, the information regarding the serving network identifier may be carried in the user-user information element field in SETUP (CC) message transmitted during a call setup procedure. For detail UUS usage, please refer to 3GPP TS22.087, TS24.087. For the peer communications apparatus receiving the call SETUP message forwarded by the corresponding serving network, the peer communications apparatus may decode the message and therefore, retrieve information regarding the PLMN_ID from the user-user IE field after identifying the IEI "7E" of the user-user IE. For detail User-user IE format, please refer to 24.008 105.4.25.

For the UUS2 application, the UserUserService may first be activated during call setup. After activation, the information regarding the serving network identifier may be carried in a dedicated UUS message, which is a CC message transmitted during a call setup procedure (before call connected), to a serving network. As the peer communications apparatus receives the UUS message forwarded by the corresponding serving network, the peer communications apparatus may retrieve information regarding the PLMN_JD carried in the UUS message. For the UUS3 application, the information regarding the serving network identifier may be carried in a dedicated UUS message and transmitted to a serving network during the active call (that is, after the call connected). As the peer communications apparatus receives the UUS message forwarded by the corresponding serving network, the peer communications apparatus may retrieve information regarding the PLMN_ID carried in the UUS message. For further introduction of user to user signaling (UUS), reference may made to, for example, the corresponding specification 3GPP TS 22.087/24.087.

According to a fifth embodiment of the invention, the message may be a register message and the second processor logic unit may carry the information regarding the serving network identifier as a unstructured supplementary service data (USSD) string in the register message. The USSD is a call independent supplementary service, which means that the message carrying the USSD string may be transmitted at anytime independent of call's existence. After the serving network receives the register message, the serving network may forward the USSD string to the peer communications apparatus via USSD message, and the peer communications apparatus may retrieve information regarding the PLMN_ID carried from the message. When the peer communications apparatus wants to reply with its serving network identifier to the communications apparatus, the peer communications apparatus may also carry information regarding the serving network identifier of a serving network associated with the peer communications apparatus in the USSD string and transmit the USSD string to the serving network in a similar way. The serving network may further forward the USSD string to the communications apparatus by carrying it in a release complete message and transmit the release complete message to the communications apparatus. For further introduction of user to user signaling (UUS), reference may made to, for example, the corresponding specification 3GPP TS 22.090/24.090.

Figure 7:
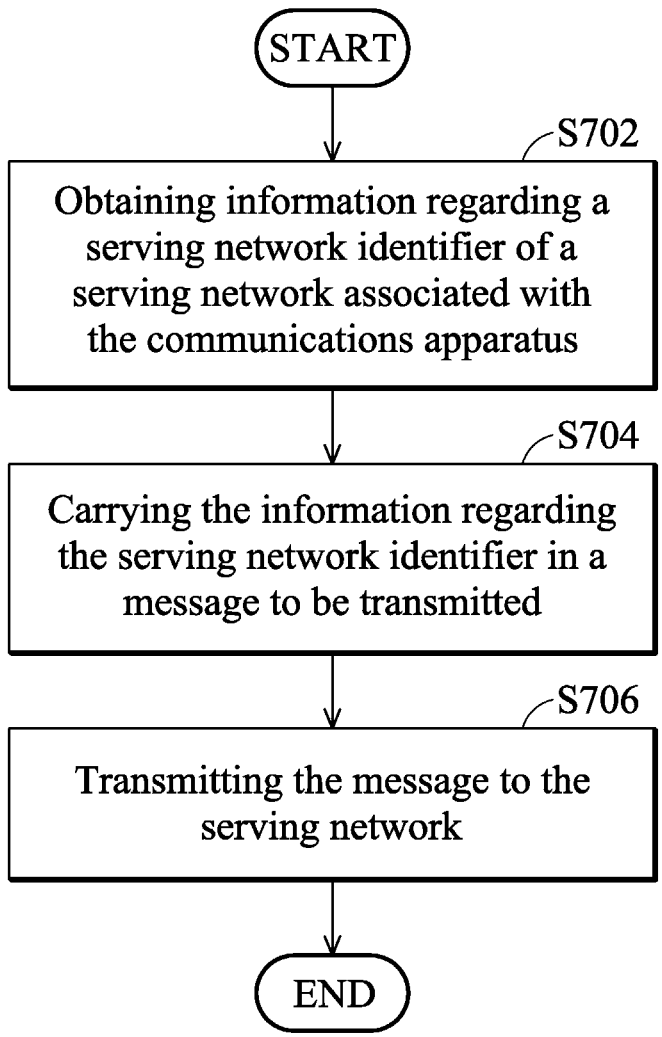
FIG. 7 shows a flow chart of a method for providing serving network information of a communications apparatus to a peer communications apparatus according to another embodiment of the invention.

FIG. 7 shows a flow chart of a method for providing serving network information of a communications apparatus to a peer communications apparatus according to another embodiment of the invention. The processor or processor logic unit of the communications apparatus may first obtain information regarding a serving network identifier of a serving network associated with the communications apparatus (Step S702). Next, the processor or processor logic unit of the communications apparatus may carry the information regarding the serving network identifier in a message to be transmitted (Step S704). Finally, the processor or processor logic unit of the communications apparatus may transmit the message to the serving network (Step S706). As previously described, the message may be a call control message transmitted during a call setup procedure, a call related supplementary service message (such as a UUS message) or a call independent supplementary service message (such as a register message carrying USSD data string). The message is transmitted over a signaling channel and the information carried in the message will ultimately be forwarded to the peer communications apparatus.

The information regarding the serving network identifier may be carried in an information element field in the message, such as a calling party sub-address IE field, a user-user IE field, a locking shift IE field or a non-locking IE field. When the information regarding the serving network identifier is carried in the message in a locking shift IE field, a predetermined information element identifier (such as "97" as shown in FIG. 6) for activating a locking shift procedure may also be carried in the message before the information regarding the serving network identifier. When the information regarding the serving network identifier is carried in the message in a non-locking shift IE field, a predetermined information element identifier (such as "9E" as shown in FIG. 6) for activating a non-locking shift procedure may also be carried in the message before the information regarding the serving network identifier.

In addition, the function provided by the communications apparatus to carry the information regarding the serving network identifier, such as in a message to be transmitted, may also be flexibly turned on or off according to the user's preference. For example, the communications apparatus may provide a user interface, such as a Man Machine Interface (MMI), to facilitate ease for the user to flexibly enable or disable the function. When the function is enabled, as the communications apparatus receives a signal or message, the communications apparatus may further decode the received signal or message to detect whether information regarding the serving network identifier associated with the peer communications apparatus which transmitted the signal or message is carried therein. The decoding scheme for retrieving the serving network identifier carried in the signal or message is dependent upon the method for carrying the serving network identifier.

Figure 8:
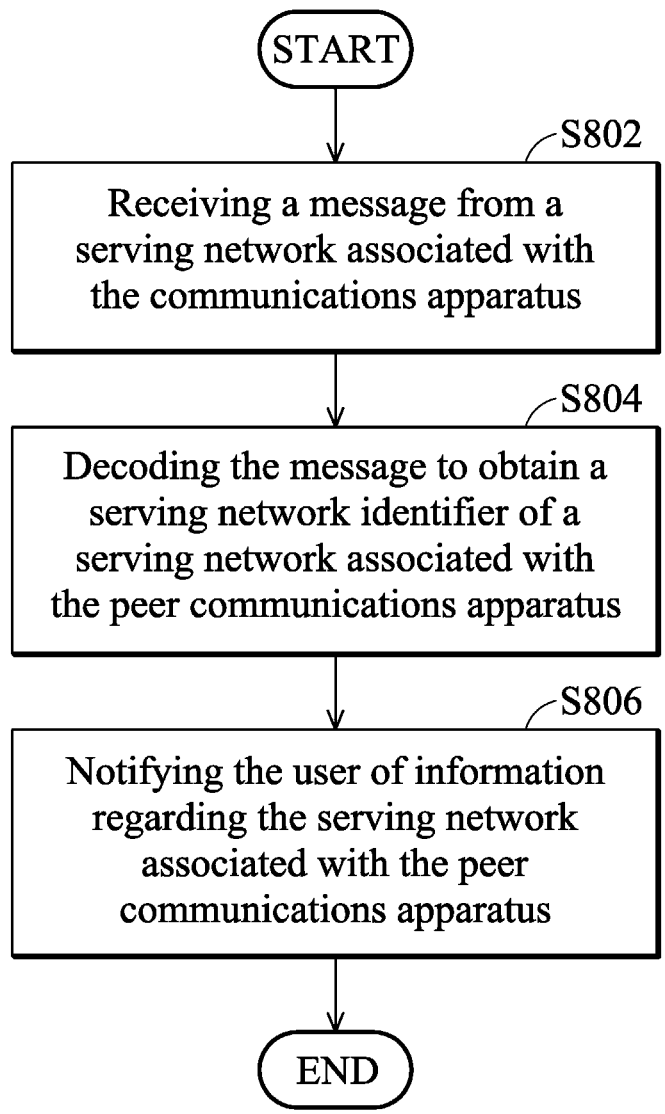
FIG. 8 shows a flow chart of a method for providing serving network information of a peer communications apparatus to a user of a communications apparatus according to another embodiment of the invention.

FIG. 8 shows a flow chart of a method for providing serving network information of a peer communications apparatus to a user of a communications apparatus according to another embodiment of the invention. The processor or processor logic unit of the communications apparatus may first receive a message (or signal) from a serving network associated with the communications apparatus (Step S802). Next, the processor or processor logic unit of the communications apparatus may decode the message to obtain a serving network identifier of a serving network associated with the peer communications apparatus (Step S804). For example, when the message is a CC message and/or information regarding the serving network identifier is carried in an information element field in the message, the processor or processor logic unit of the communications apparatus may decode the message according to the initially active codeset 0, or, when the locking or non-locking shift procedure is activated by the peer communications apparatus, the processor or processor logic unit of the communications apparatus may decode the message according to the user defined new codeset (such as codeset 7). For another example, when the message is a call related supplementary service message (such as a UUS message) or a call independent supplementary service message (such as a release complete message), the processor or processor logic unit of the communications apparatus may decode the message according to the corresponding decoding rule to obtain the serving network identifier. Finally, the processor or processor logic unit of the communications apparatus may notify the user of information regarding the serving network associated with the peer communications apparatus (Step S806). In this manner, the user may know whether the communications established with the peer communications apparatus is intra-PLMN or inter-PLMN communications. The ways to notify the user of information regarding the serving network has been illustrated above and are omitted here for brevity.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
   a radio transceiver;
   a subscriber identity card storing a public land mobile network (PLMN) identifier;
   a processor, coupled to the subscriber identity card and the radio transceiver,
   wherein the subscriber identity card camps on a cell operating in a first serving network having the PLMN identifier via the radio transceiver, and
   wherein when establishing communications with a peer communications apparatus via the radio transceiver, the processor is configured to obtain the PLMN identifier from an international mobile subscriber identity (IMSI) elementary file stored in the subscriber identity card, carry the PLMN identifier in a first message to be transmitted to a the peer communications apparatus, and transmit the first message over a signaling channel instead of a traffic channel to the peer communications apparatus via the radio transceiver, and
   wherein the processor is further configured to receive a second message, decode the second message to obtain a PLMN identifier of a second serving network associated with a subscriber identity card of the peer communications apparatus, determine whether the first serving network and the second serving network are the same, and notify a user of the determination result,
   wherein when the first serving network and the second serving network are the same, the processor is further configured to generate a first notification signal to notify the user that the first serving network and the second serving network are the same, and
   when the first serving network and the second serving network are the different, the processor is further configured to generate a second notification signal to notify the user that the first serving network and the second serving network are different;
   wherein the first message is a call control message transmitted during a call setup procedure;
   wherein the first message is a register message and the processor carries the PLMN identifier as an unstructured supplementary service data string in the first message.

2. The communications apparatus as claimed in claim 1, wherein the processor carries the PLMN identifier in an information element field in the first message.

3. The communications apparatus as claimed in claim 2, wherein the information element is a locking shift information element.

4. The communications apparatus as claimed in claim 2, wherein the information element is a non-locking shift information element.

5. The communications apparatus as claimed in claim 1, wherein the first message is a user to user signaling message.

6. A method for providing serving network information of a communications apparatus to a peer communications apparatus, comprising:
   obtaining a PLMN identifier of a first serving network associated with the communications apparatus from an international mobile subscriber identity (IMSI) elementary file stored in a subscriber identity card of the communications apparatus when the communications apparatus establishes communications with the peer communications apparatus, wherein the subscriber identity card of the communications apparatus camps on a cell operating in the first serving network having the PLMN identifier via a radio transceiver of the communications apparatus;
   carrying the PLMN identifier in a first message to be transmitted;
   transmitting the first message over a signaling channel instead of a traffic channel to the peer communications apparatus;
   receiving a second message and decoding the second message to obtain a PLMN identifier of a second serving network associated with a subscriber identity card of the peer communications apparatus;
   determining whether the first serving network and the second serving network are the same; and
   notifying a user of the determination result,
   wherein when the first serving network and the second serving network are the same, generating a first notification signal to notify the user that the first serving network and the second serving network are the same, and
   wherein when the first serving network and the second serving network are different, generating a second notification signal to notify the user that the first serving network and the second serving network are different;
   wherein the first message is a call control message transmitted during a call setup procedure;
   wherein the first message is a register message and the PLMN identifier is carried as an unstructured supplementary service data string in the first message.

7. The method as claimed in claim 6, wherein the step of carrying the PLMN identifier further comprises:
   carrying a predetermined information element identifier for activating a locking shift procedure in the first message;
   carrying the PLMN identifier in a locking shift information element field following the predetermined information element identifier in the first message.

8. The method as claimed in claim 6, wherein the step of carrying the PLMN identifier further comprises:
   carrying a predetermined information element identifier for activating a non-locking shift procedure in the first message;

carrying the PLMN identifier in a non-locking shift information element field following the predetermined information element identifier in the first message.

9. The method as claimed in claim 6, wherein the step of carrying the PLMN identifier further comprises:
carrying the PLMN identifier in an information element field in the first message, wherein the information element field is a calling party sub-address information element field.

10. The method as claimed in claim 6, wherein the step of carrying the PLMN identifier further comprises:
carrying the PLMN identifier in an information element field in the first message, wherein the information element field is a user-user information element field.

11. The method as claimed in claim 6, wherein the first message is a user to user signaling message.

* * * * *